United States Patent Office 3,631,190
Patented Dec. 28, 1971

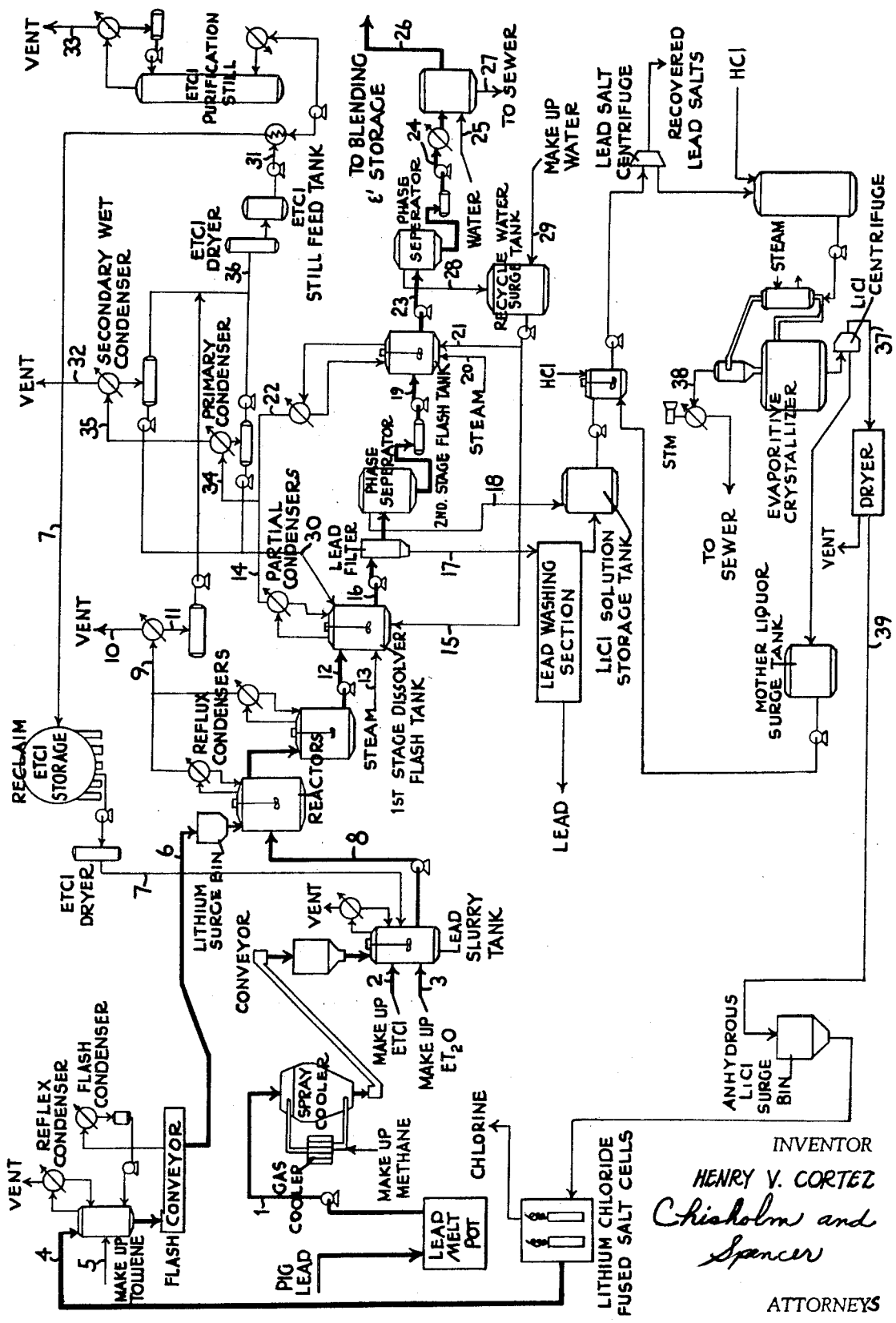

3,631,190
PROCESS FOR PRODUCING
HYDROCARBONLEADS
Henry V. Cortez, Corpus Christi, Tex., assignor to PPG Industries, Inc., Pittsburgh, Pa.
Continuation-in-part of application Ser. No. 783,387, Dec. 12, 1968, which is a continuation-in-part of applications Ser. No. 593,845 and Ser. No. 593,747, both Nov. 14, 1966. This application Apr. 28, 1970, Ser. No. 32,705
Int. Cl. C07f 7/24
U.S. Cl. 260—437 R    53 Claims

ABSTRACT OF THE DISCLOSURE

The instant invention provides an improved process whereby tetrahydrocarbonlead compounds are produced from metallic leads in yields approaching 100 percent based on the lead. According to the invention, hydrocarbonlead compounds are produced from metallic lead and hydrocarbon halides in the presence of metallic lithium. The reaction may be represented by the generic expression:

(4)    $Pb + 4Li + 4RX \rightarrow Pb(R)_4 + 4LiX$ wherein RX represents a hydrocarbon halide in which X represents chlorine, bromine and/or iodine and R represents an unsubstituted alkyl, alkenyl and/or aryl group. The specific reactions of most interest are those in which the hydrocarbon constituents of the reactants and the product contain 1 through 6 carbon atoms. Reactions in which these hydrocarbon constituents contain more than 6 carbon atoms are within contemplation but are of relatively little present day commercial interest.

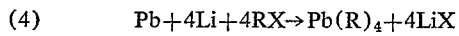

This is a continuation-in-part application of applicant's copending application Ser. No. 783,387, filed Dec. 12, 1968, and now abandoned which is a continuation-in-part application of applicant's applications Ser. Nos. 593,845, and 593,747, both filed Nov. 14, 1966, and both now abandoned.

BACKGROUND OF THE INVENTION

This invention relates to the manufacture of hydrocarbon lead compounds. More specifically this invention relates to the manufacture of tetrahydrocarbonlead compounds such as tetramethyllead, tetraethyllead, tetrabutyllead, tetravinyllead, tetraphenyllead and mixed alkylleads such as dimethyldiethyllead, methyltriethyllead, triethylmethyllead, diethyldiphenyllead, methyldiethylphenyllead, and the like. The use of these compounds, particularly those in which the hydrocarbon constituents are methyl, ethyl, and/or vinyl groups, as anti-knock agents in fuel for internal combustion engines is well known. They have other uses which are less well known. Tetrabutyllead, for example, has fungicidal properties and is used as raw material for the production of polymeric food packaging materials.

The predominant present day commercial process for the manufacture of tetraethyllead involves reacting monosodium lead alloy with ethyl chloride in accordance with the following equation:

(1)    $4NaPb + 4EtCl \rightarrow Pb(Et)_4 + 4NaCl + 3Pb$

This specific reaction is typical of a class reaction whereby many other tetrahydrocarbonlead compounds may be produced. The class reaction may be expressed by the generic equation:

(2)    $4NaPb + 4RX \rightarrow Pb(R)_4 + 4NaX + 3Pb$

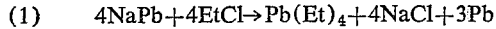

wherein X represents chlorine, bromine and/or iodine and R represents unsubstituted alkyl, alkenyl and/or aryl groups, particularly those containing 1 through 6 carbon atoms. Recently, tetramethyllead has been produced commercially in accordance with this reaction, for example.

Although the aforedescribed process has been commercially successful, it has several notable undesirable characteristics. For example, it is necessary to form a sodium-lead alloy with very specific chemical and physical properties. Production of a suitable alloy involves sophisticated techniques and imposes considerable investment and operating expense on the commercial plant. Typically, a monosodium lead alloy is employed. When this alloy is reacted with excess hydrocarbon halide, a theoretical maximum of one-fourth of the lead reactant enters into the reaction. Yields of tetraethyllead have been considerably less than the theoretical maximum of 25 weight percent based on the lead. Thus, more than three-fourths of the lead charged remains in the reaction zone at the completion of the reaction. This unreacted lead is usually recovered and realloyed with sodium. The recycling of unreacted lead is expensive and typically results in the build-up of undesirable impurities in the alloy.

The aforedescribed commercial process also requires sophisticated reaction equipment. High pressure autoclaves are required to withstand the pressures which build up during the reaction. Uniform temperature control, although extremely desirable, is generally not achieved in the autoclaves presently employed for the manufacture of tetraalkylleads. Periodically, large quantities of product and reactants are vented and lost due to autoclave "upsets." An "upset" occurs when there is a loss of temperature and/or pressure control within the autoclave. In addition, it is usually considered necessary to equip the autoclaves with internal mixing means such as mechanical agitators or plows. These agitators often become fouled with the lead sludge residue of the reaction.

Several reaction mechanisms have been proposed to improve the yield of tetrahydrocarbonleads over that obtained with the aforedescribed commercial process. A process whereby tetraalkyllead is produced by the electrolysis of an ether solution of a Grignard reagent has recently achieved commercial success, for example. For reasons of economics, safety and simplicity of operation, among other reasons, there remains a need for an improved non-electrolytic process for the production of tetrahydrocarbonlead compounds. Several non-electrolytic processes based on Grignard type reactions have been proposed for the production of tetraalkyllead. Apparently none of these proposals has achieved commercial success in spite of the relatively high yields theoretically obtainable.

Other processes have been proposed wherein an "active" form of lead is reacted with magnesium or lithium compounds to produce tetrahydrocarbonleads. Apparently, the only "active" lead considered to have commercial potential is the "by-product" lead recovered from an autoclave reactor after the completion of an alkylation of sodium-lead alloy in accordance with Equation 1 or 2.

It has been proposed in U.S. Pat. 2,558,207, for example, that alkyllead and aryllead compounds be produced by reacting lead with an alkylating or arylating agent and an alkyl or aryl lithium compound. Thus, according to the examples of that patent tetraethyllead is produced by reacting the "by-product" lead obtained from the ethylation of a sodium-lead alloy with ethyl chloride and ethyllithium. The reaction is said to proceed according to the equation:

(3)    $Pb + 2EtCl + 2EtLi \rightarrow Et_4Pb + 2LiCl$

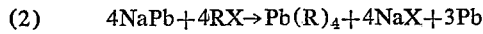 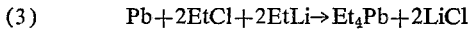

The reaction was reportedly conducted in equipment of the type used in the commercial process described in connection with Equation 1.

THE INVENTION

The instant invention provides an improved process whereby tetrahydrocarbonlead compounds are produced from metallic lead in yields approaching 100 percent based on the lead. According to this invention, hydrocarbonlead compounds are produced from metallic lead and hydrocarbon halides in the presence of metallic lithium. The proposed process is based on a class reaction analagous to that represented by Equation 2. The reaction may be represented by the generic expression:

(4)   $Pb + 4Li + 4RX \rightarrow Pb(R)_4 + LiX$ wherein RX represents a hydrocarbon halide in which X represents chlorine, bromine and/or iodine and R represents an unsubstituted alkyl, alkenyl and/or aryl group. The specific reactions of most interest are those in which the hydrocarbon constituents of the reactants and the product contain 1 through 6 carbon atoms. Reactions in which these hydrocarbon constituents contain more than 6 carbon atoms are within contemplation but are of relatively little present day commercial interest.

The specific reaction for the production of tetraethyllead may be represented by the equation:

(5)   $Pb + 4Li + 4EtCl \rightarrow Pb(Et)_4 + 4LiCl$

The hydrocarbon halides of most interest to the present invention are the alkyl and aryl chloride, notably methyl chloride, ethyl chloride, propyl chloride, isopropyl chloride, n-butyl chloride and phenyl chloride. The corresponding bromides and iodides as well as other hydrocarbon halides, e.g., vinyl chloride (iodide or bromide) and tertiarybutyl chloride (iodide or bromide) are also within contemplation. Any hydrocarbon halide containing the hydrocarbon constituents desired for the hydrocarbonlead product may be employed. The use of a considerable excess of the hydrocarbon halide, typically at least 100, preferably between about 100 and about 300 percent excess, is highly preferred. Much lower excesses of methyl halides are preferred, e.g., about 25 to about 100 percent.

A mixture of hydrocarbon halides may be employed in the reaction illustrated by Equation 4. When the mixture includes more than one hydrocarbon constituent, a mixture of hydrocarbonlead compounds is produced. For example, lead and lithium powders may be reacted with a mixture of ethyl chloride and methyl chloride to produce a product including tetraethyllead, triethylmethyllead, diethyldimethyllead, ethyltrimethyllead and tetramethyllead. Specialized reaction conditions are required for conducting reactions involving methyl halides. Thus, if it is desired to produce a mixed product including methyl groups as part of the hydrocarbon constituents, the reaction should be conducted under the conditions disclosed hereinafter in conjunction with the production of tetramethyllead.

With the exception of products containing methyl constituents, good yields are obtainable with lithium of high purity. An example of high purity lithium metal is that containing in excess of about 97.5 percent by weight alkali metal of which 99.9 or more weight percent is lithium, the remaining 0.1 weight percent alkali metal consisting essentially of sodium and/or potassium. It has been found, however, that the reaction time is considerably reduced by employing lithium which contains a higher percentage, i.e., more than about 0.1, preferably about ¼ to about 1 percent by weight of an alkali metal other than lithium, notably sodium and/or potassium. Such an alkali metal impurity is required to obtain good yields from reactions involving a methyl halide.

The alkali metals are desirably well dispersed in physical association with the lithium metal. That is, the alkali metal impurities are preferably present in discrete particles of lithium metal. One suitable method of dispersing the alkali metal impurity in the lithium is to add the desired quantity of alkali metal, e.g., sodium, to a quantity of molten lithium. The alkali metal impurity may be added in solid or molten state. The molten mixture is then cooled and manufactured into the form desired for use in the reaction, e.g., pellets, powder or extruded wire. The reaction time required for the reaction whereby tetraethyllead is produced by reacting lithium metal powder and lead metal powder with ethyl chloride was reduced from about 2 hours to about 1½ hours when about 1 percent by weight sodium was dispersed in this fashion in the lithium powder employed. Suitable lithium metal containing the desired quantity of alkali metal impurity can also be produced by electrolytic techniques. Quantities of alkali metal impurity in excess of 1 percent by weight, e.g., 5 percent or more, are tolerable but are unnecessary and are ordinarily uneconomical.

Yields are improved when an excess of lithium is employed. An excess of about 10 to about 20 mole percent lithium, based on the lead, significantly enhances the conversion of lead to hydrocarbonlead products. Greater amounts of lithium are not generally detrimental. Smaller excesses of lithium while not as beneficial are nevertheless helpful to the reaction.

The lithium is desirably maintained substantially free from lithium salts such as $Li_3N$, $Li_2CO_3$, $LiOH$, and $Li_2O$. These and like salts are tolerable in small amounts although they are non-reactive. For example, the presence of 10 mole percent $Li_3N$ (based on the lithium) in admixture with lithium powder does not appear to adversely affect the yield of tetraethyllead from this reaction. If these salts coat the surface of the lithium metal, they may inhibit the reaction. Because lithium metal is highly reactive with both nitrogen and oxygen, it is preferably stored and handled in an atmosphere inert to lithium. Suitable atmospheres include the noble gases, particularly argon, because of its availability. In many cases, hydrocarbon gases such as methane, ethane, propane, butane, etc., are useful. Natural gases are generally suitable for this purpose.

A high lithium surface area is helpful to the reaction. For example, lithium powder of about 200 microns has been found to react readily and completely at low temperatures (12–16° C.). Although particle size is not critical to the reaction, lithium powder with average particle size between about 100 microns and about 10 millimeters is preferred in embodiments where a high rate of reaction is desired. When sodium is present in the lithium powder, the particle size of the lithium powder has less effect on the rate of reaction. According to some embodiments, lithium wire is extruded directly into the reactor.

A noteworthy characteristic of the present invention is that the lead employed may be in any of a variety of convenient metallic forms. A particularly suitable lead is finely-divided metallic lead. Unlike previous suggestions, the lead may be in forms other than the "active" by-product lead hereinbefore described. Significant yields, e.g., about 25 percent, based on the lead, are obtainable with lead of varying size and purity. Normal lead, i.e., lead produced by conventional melting or smelting techniques is highly preferred. The reaction proceeds much more readily when the lead is finely-divided, e.g., when the average particle size of the lead is about 5 to about 500 microns. High yields and prompt reaction initiation are consistently obtained with lead powders analyzing about 90 percent minus 325 mesh. Suitable finely-divided lead is readily prepared by comminuting solidified normal lead or by dispersing molten normal lead in a fluid cooling medium, e.g., inert hydrocarbon gases or liquids. Lead shot (39.9 percent +20 mesh, 59.9 percent −20 +30 mesh, 6.2 percent −30 mesh) reacts under similar conditions more slowly and produces lower yields. If lead shot is employed, longer reaction times and/or higher reaction temperatures may be required to obtain acceptable yields. These longer reaction times and higher reaction temperatures generally favor undesirable side reactions. Hence, finely-divided lead is highly preferred. High purity lead is more completely converted to hydrocarbon-lead product than lead containing appreciable amounts of lead oxides. For example, yields are substantially higher if the lead employed contains less than about 1,000, preferably less than about 500 p.p.m. oxygen, based on the weight of the lead (including both combined and metallic lead).

A highly desirable feature of the instant invention is that it can be conducted at low temperatures without drastically decreasing yields or unduly increasing reaction time. It can further be conducted at low pressures, e.g., atmospheric pressure, in simple reaction vessels. Thus, the present invention makes it possible to avoid the elaborate pressure and temperature control devices and high pressure reaction vessels relied upon heretofore. One suitable reactor comprises a stirred low pressure vessel openly connected to a reflux condenser. Even in the production of tetramethyllead, the temperatures and pressures required by the practice of the present invention are considerably below those required in the present day commercial production of tetramethyllead in accordance with Equation 2. Accordingly, the reactions of the present invention are conveniently conducted at temperatures below those at which undesirable side reactions such as Wurtz-type reactions unduly decrease the yield of hydrocarbonlead product.

The reactants can be combined in several ways. According to one preferred embodiment, lithium metal powder, lead metal powder, and hydrocarbon halide are charged to a reaction chamber at the beginning of the reaction. The hydrocarbon halide may be provided in increments during the course of the reaction. In other embodiments, a reaction is initiated between lithium metal and hydrocarbon halide. Lead metal is then provided, either in a single charge or in increments, to the resulting reaction mixture. The lead metal may be provided as dry powder or slurried in hydrocarbon halide. Either or both the lead and lithium may be slurried in a solvent. Any of the solvents known by the art to be useful as reaction media or diluents for the production of tetraalkylleads may be employed for this purpose. Typical of such solvents are liquid hydrocarbons with normal boiling points between about 90 and 150° C., e.g., toluene, benzene, hexane, heptane, iso-octane, n-octane, styrene, the xylenes, ethyl benzene, nonane, 3-ethyl hexane, 2-methyl hexane, 3-methyl hexane, 2,5-dimethyl heptane, 4-ethyl heptane, 2,5-dimethyl-1,3-hexene, hexene and heptene; and kerosene. After completion of the reaction, hydrocarbonlead and lithium halide are recovered from the reaction mixture. The lithium halide is desirably treated to recover metallic lithium for recycle to the reactors. The invention may be practiced in either a batch or a continuous fashion.

As an example of the present invention, if it is desired to produce tetramethyllead or other hydrocarbonlead compounds which contain methyl groups, the methyl halide reactant should be combined gradually with the lithium metal and lead metal in a substantial quantity, generally at least 150 mole percent, based on the lead, of a polar solvent. The polar solvent should be one in which methyllithium is soluble. It should further be substantially chemically inert to lithium and methyllithium. Most nonsubstituted ether compounds, notably the alkyl ethers, are useful polar solvents. The lead and lithium need not all be present in the solvent at the start of the reaction although sufficient quantities of these metals should be present in the solvent medium before the introduction of the methyl halides to support the reaction. The methyl halide is added at a rate sufficiently slow to maintain an exothermic reaction. If the concentration of methyl halide becomes too high, i.e., more than about 5 mole percent, in the solvent, the reaction is suppressed and yields are extremely low, typically below 5 percent. The procedures effective for reactions involving methyl halides are also effective for reactions involving the other hydrocarbon halides of this invention.

In the reactions of this invention, the polar solvent is present in large amounts, i.e., about 400 to about 2,000 mole percent or more, based on the lead. The preferred polar solvents are ether compounds. Suitable ethers include both aliphatic and aromatic ethers as well as mixtures thereof. Both the simple (ROR) and mixed (ROR') ethers are useful. The aliphatic constituents may be either saturated or unsaturated. In general, any ether which is liquid under the conditions of the reaction may be used. These ethers typically have fewer than 20 carbon atoms. Suitable ether solvents include by way of example alkyl ethers such as methyl ether, methylethyl ether, ethyl ether, isopropyl ether, n-butyl ether and n-hexyl ether; cyclic ethers such as tetrahydrofuran, tetrahydropyran and dioxane (1,3-dioxane and/or 1,4-dioxane) and the lower mono- and di-aryl and mono- and di-alkyl ethers of the glycols, particularly the lower alkylene glycols. Examples of useful glycol ethers are the mono- and dimethyl, the methylethyl and the mono- and di-ethyl ethers of ethylene and diethylene glycols. The alkyl ethers, tetrahydrofuran and tetrahydropyran represent a preferred class. The alkyl ethers are highly preferred. Degradation of the solvent is sometimes experienced, particularly when hydrocarbon halides other than the methyl halides are employed. Ethers such as n-hexyl ether and tetrahydropyran are relatively stable under the conditions of the reaction and are preferred when ether recoveries are economically important. Ethyl ether is generally preferred because it is easily separated from the product. The cost of the ether solvent lost due to solvent degradation is typically more than offset by the avoidance of a costly recovery step necessitated by the use of more stable ethers.

The reactions of this invention include a first, highly exothermic stage and a subsequent, less exothermic stage. To maintain high yields without undue side reactions, the reaction temperature should ordinarily be kept as low as convenient. Some external cooling may be employed, if desired, to maintain low temperatures in the reaction mass during the initial stage of the reaction. Subsequent to the first highly exothermic portion of the reaction, the reactions are usually conveniently operated at autogenous temperature and pressure with no further cooling needed. Often, external cooling is dispensed with entirely because the autogenous temperature of the reaction mass, even during the initial stage of the reaction, is acceptable.

Unless a by-product suppressor is employed in the reaction, only a portion of the hydrocarbonlead compounds produced in the practice of this invention are the commercially desirable tetrahydrocarbonlead compounds. Substantial quantities of hexahydrocarbondilead compounds and smaller amounts of hydrocarbonlead halides are also produced. Thus, the present invention provides a process for producing simultaneously and in high yields both tetraalkyllead and hexaalkyldilead, for example. The tetrahydrocarbonlead compounds may be separated from the hydrocarbonlead by-products by well known techniques such as distillation. Often, however, there is little or no market for these by-products so their production decreases the commercial attractiveness of the process. It has been found that the use of ether compounds suppresses the yield of the aforementioned hydrocarbonlead by-products and enhances the yield of the desired tetrahydrocarbonlead compounds.

For example, in the preparation of tetraethyllead by reacting lithium metal, lead metal and ethyl chloride, substantial quantities of hexaethyldilead and other products such as triethyllead chloride are typically produced along with the tetraethyllead. When the by-product suppressors of the present invention are employed, the amount of tetraethyllead produced is significantly increased while the amount of undesirable hydrocarbonlead by-products present in the reaction mass at the completion of the reaction is significantly reduced.

It has been found that the presence of substantial quantities, on the order of 10 mole percent based on the lead, of the ether in the reaction mass during the reaction substantially eliminates the accumulation of undesirable by-products in the tetrahydrocarbonlead product recovered from the reaction zone. Large excesses of the ether, e.g., 50 mole percent or more, are tolerable but unnecessary. A large excess of ether does not appear to adversely affect the reaction. When quantities much less than 10 mole percent, e.g., 6 mole percent, of ether is employed, some hydrocarbonlead by-product is typically found in the reaction mixture. The ether compounds useful as by-product suppressants are also the preferred polar solvents employed in tthe reactions involving methyl halides. In these reactions, the ether compound is often present in very large amounts, i.e., about 400 to about 2,000 mole percent or more, based on the lead.

Suitable ethers include both aliphatic and aromatic ethers as well as mixtures thereof. Both the simple (ROR) and mixed (ROR') ethers are useful. The aliphatic constituents may be either saturated or unsaturated. In general, any ether which is liquid under the conditions of the reaction may be used. These ethers typically have fewer than 20 carbon atoms. Suitable ether solvents include by way of example alkyl ethers such as methyl ether, methylethyl ether, ethyl ether, isopropyl ether, n-butyl ether and n-hexyl ether; cyclic ethers such as tetrahydrofuran, tetrahydropyran and dioxane (1,3-dioxane and/or 1,4-dioxane) and the lower mono- and di-aryl and mono- and di-alkyl ethers of the glycols, particularly the lower alkylene glycols. Examples of useful glycol ethers are the mono- and di-methyl, the methylethyl and the mono- and di-ethyl ethers of ethylene and diethylene glycols. The alkyl ethers, tetrahydrofuran and tetrahydropyran represent a preferred class. The alkyl ethers are highly preferred. Yields of tetraethyllead approaching 100 percent based on the lead are obtained by reacting lead powder with an excess of lithium powder and an excess of ethyl chloride in the presence of at least 10 mole percent, based on lead, of ethyl ether, isopropyl ether, n-butyl ether, n-hexyl ether, tetrahydrofuran or tetrahydropyran, respectively. Degradation of the solvent is sometimes experienced. Ethers such as n-hexyl ether and tetrahydropyran are relatively stable under the conditions of the reaction and are preferred when ether recoveries are economically important. Ethyl ether is generally preferred in the production of tetraethyllead because it is easily separated from the product. The cost of the ether solvent lost due to solvent degradation is typically more than offset by the avoidance of a costly recovery step necessitated by the use of more stable ethers.

The reactions of this invention include a first, highly exothermic stage and a subsequent, less exothermic stage. To maintain high yields without undue side reactions, the reaction temperature should ordinarily be kept as low as convenient. Some external cooling may be employed, if desired, to maintain low temperatures in the reaction mass during the initial stage of the reaction. Subsequent to the first highly exothermic portion of the reaction, the reactions are usually conveniently operated at autogenous temperature and pressure with no further cooling needed. Often, external cooling is dispensed with entirely because the autogenous temperature of the reaction mass, even during the initial stage of the reaction is acceptable.

The products of most present day commercial interest are tetramethyllead, tetraethyllead and mixed alkylleads containing both methyl and ethyl groups. The reactions for producing tetramethyllead or tetraethyllead are both conducted with good yields. In the production of tetraethyllead, the reaction is conveniently carried out in a stirred low pressure tank communicating with a reflux condenser. When this reaction is conducted at atmospheric pressure, a convenient temperature for the reaction is between about 12° C. and about 16° C., the normal boiling range of the reaction mixture at atmospheric pressure. On a larger scale, higher temperatures, e.g., about 20° C. to about 45° C., may be more convenient to avoid external cooling of the reactor. If it is desired to conduct the reaction to produce tetramethyllead from methyl chloride, moderate pressures, e.g., about 50 to about 80, rarely above 125 p.s.i., may be employed to keep the methyl halide (typically methyl chloride) liquid at convenient, e.g., ambient temperature.

In general, provided the reaction temperature is held below about 60° C., yields are substantially independent of reaction temperature and pressure. It is recognized that the rate of reaction may be undesirably decreased if the reaction mass is cooled unduly, e.g., several degrees below 0° C. In practice, it is rarely, if ever, advantageous to operate at such low temperatures because the normal reflux temperature of the reaction mass is generally well above 0° C. On the other hand, when high-boiling hydrocarbon halide reactants, such as butyl chloride, are employed, it may be desirable to operate at or close to the normal reflux temperature of the reaction mass even if this temperature exceeds 60° C. Above about 60° C., good yields are obtained but undesirable competing side reactions are encouraged. Accordingly, the pressure and temperature conditions for the reaction may be selected to preserve the simplicity of the equipment designed for the process and to maintain the hydrocarbon halide reactant in the desired phase. The reaction usually proceeds more readily and completely if the contents of the reactor are stirred or otherwise agitated.

The aforedescribed parameters, i.e., reaction temperature, alkali metal content of the lithium metal employed, the use of excess lithium in the reaction, the use of finely-divided lead, the use of high purity normal lead, the presence of an ether compound during the reaction and the use of excess hydrocarbon halide each have a profound effect on the reaction rate and/or the yield of the present invention. Although often one or more of these parameters can be maintained outside the preferred range disclosed herein without impairing the economics of the process to an intolerable degree, optimum results are obtained by strictly observing all of the herein disclosed preferred operating conditions. To consistently obtain high yields at rapid rates, at least four of the aforedescribed parameters should be controlled within the preferred range. For example, when ethyl chloride, lead and lithium metal are charged to a reaction zone, yields of tetraethyllead in excess of 90 percent based on the lead, are consistently obtained in reaction times below about 4 hours only when at least four of the following process limitations are observed:

(a) The reaction is conducted at a temperature below about 60° C., preferably below about 45° C.;

(b) The lithium metal reagent contains as an impurity more than about 0.1 percent by weight of an alkali metal other than lithium, preferably between about ¼ and 1 percent by weight, the preferred impurity being sodium;

(c) At least about 10 percent excess lithium is employed for the reaction, i.e., at least about 4.4 moles of lithium are introduced to the reaction zone per mole of lead introduced thereto;

(d) The lead reagent charged to the reaction zone is normal lead powder with an average particle size below about 1 millimeter in diameter, preferably between about 5 and about 500 microns in diameter;

(e) The lead reagent contains less than about 1,000 p.p.m., preferably less than about 500 p.p.m. by weight oxygen;

(f) An ether compound is present in the reaction zone during the reaction, preferably in an amount above about 10 mole percent based on the lead, the preferred ethers being the alkyl ethers, tetrahydrofuran and tetrahydropyran; and (g) At least about 100, preferably between about 100 and about 300 percent excess ethyl chloride is introduced to the reaction zone, i.e., at least about 8 moles, preferably between about 8 and about 16 moles of ethyl chloride are introduced to the reaction zone per mole of lead introduced thereto.

It should be understood that quantities expressed herein and in the claims as "percent excess" or as being "based on lead" assume the stoichiometry of Equation 4. Thus, "based on lead" is understood to mean the lead which can theoretically react in accordance with Equation 4. If more than 1 mole of lead is introduced to the reaction zone for each 4 moles of lithium, for example, the number of moles of lead which can theoretically react is limited to one-quarter the number of moles of lithium introduced. "Based on lead" should then be understood to mean "based on one-quarter the moles of lithium introduced."

The considerations disclosed with respect to the production of tetraethyllead are equally applicable to the production of other tetrahydrocarbonlead compounds of which the hydrocarbon constituents each contain at least 2 carbon atoms. It is particularly preferred that an ether compound be present in the reaction zone during the reaction. It is also highly preferred that the lead reagent be finely-divided normal lead. According to one especially preferred embodiment, the aforedescribed operating conditions concerning the ether compound, finely-divided lead, excess lithium, excess hydrocarbon halide and at least 2 of the remaining itemized preferred operation conditions are observed.

Less freedom of choice is available for the efficient production of tetrahydrocarbonlead compounds of which one or more of the hydrocarbon constituents is a methyl group. These reactions generally require, if they are to provide product in high yield, substantial quantities of a polar solvent, preferably an ether compound, at least about 0.1 preferably about ¼ to about 1 percent of an alkali metal other than lithium, preferably sodium, in the lithium metal and the gradual addition of methyl halide to the reaction zone at least during the course of the initial highly exothermic reaction. In addition, it is preferred that each of the following conditions be observed:

(a) The reaction is conducted below about 60° C., preferably below about 45° C.;

(b) At least about 10 percent excess lithium is employed for the reaction, i.e., at least about 4.4 moles of lithium are introduced to the reaction zone for each mole of lead introduced thereto;

(c) The lead reagent charged to the reaction zone is normal lead powder with an average particle size below about 1 millimeter in diameter, preferably between about 5 and about 500 microns in diameter;

(d) The lead reagent contains less than about 1,000 p.p.m., preferably less than about 500 p.p.m. by weight oxygen;

(e) The concentration of methyl halide in the polar solvent be held below about 5 mole percent, preferably below about 1 mole percent based on the solvent during the initial highly exothermic part of the reaction. During the subsequent stages of the reaction, the concentration of methyl halide may be increased but is still kept lower than is desired for reactions relying upon other hydrocarbon halides. Usually no more than 100 percent excess (8 moles per mole of lead) methyl halide is added to the reaction zone for the production of tetramethyllead, for example.

It is particularly preferred that the aforelisted conditions with respect to excess lithium, methyl halide concentration and finely-divided lead be practiced. In any event, it is highly beneficial to conduct the reaction in accordance with at least 4 of the aforelisted conditions.

The accompanying drawing is a flow sheet illustrating the production of tetrahydrocarbonlead in accordance with the instant invention. The following example describes the preparation of tetraethyllead, with particular reference to the drawing. In general, the same flow sheet may be followed to produce tetrahydrocarbonlead compounds of which the hydrocarbon constituents each contain at least 2 carbon atoms. Lead powder is prepared by spraying molten lead from line 1 into a stream of cooled methane in a spray cooler. The dry powdered product, with an average particle size of about 200 microns, is slurried with ethyl chloride from line 2 and ethyl ether from line 3 in a slurry tank.

Lithium powder is prepared by feeding a fine spray of molten lithium from line 4 into a bath of boiling toluene in an agitated quench vessel operating at 70 p.s.i. and about 170 to 175° C. Toluene is fed to the agitated quench vessel via line 5. The quench vessel communicates with a reflux condenser which serves to remove the heat of fusion of the lithium. A slurry of particulate lithium and toluene is forwarded through a flash conveyor wherein it is flashed to atmospheric pressure from the quenching pressure thereby vaporizing the toluene and leaving essentially dry lithium powder of about 200 micron particle size. The dry powder in line 6 is fed to a surge bin where it is stored until it is fed to the reactors. The vaporized toluene is recycled through a condenser and back to the lithium quench tank.

It is highly desirable to maintain the aforedescribed reactant's preparation section of the process free from oxygen and nitrogen in the lithium preparation section and oxygen in the lead preparation section. The oxides of lead and lithium and lithium nitride are substantially unreactive in the reaction. Their presence results in decreased yields and consequently in decreased capacity of the plant. Accordingly, the equipment of the reactant's preparation section of the plant is preferably operated with an inert gas pad. A nitrogen or methane pad may be used in the lead preparation section of the plant. An argon pad or methane pad is preferred in the lithium preparation section, particularly the surge bin.

The reaction is carried out in a reaction zone comprising a series of agitated tank reactors operating at atmospheric pressure and the normal boiling point of ethyl chloride (about 54° F.). According to the present example, there are four such reactors in the series. Only the initial and final reactors of the series are shown on the drawing. Dried lithium powder in line 6 is charged to the first reactor from the surge bin, e.g., through a rotary valve feeder. The ethyl chloride-lead slurry in line 8 containing about 15 mole percent diethylether, basis the lead, is charged to the same reactor. The reactors provide a total residence time of about 4 hours and are sufficiently agitated to provide complete suspension of the solids. The reaction is highly exothermic. Accordingly, cooling is provided by refrigerated reflux condensers openly communicating with each of the reactors. The reactors are arranged for series flow by gravity overflow. A minor amount, rarely more than about 8 percent of the lithium is consumed in Wurtz type reactions forming inert by-products such as butane. These inert by-products in admixture with ethyl chloride vapors in line 9 are vented from the reactors to a condenser. Condensed ethyl chloride in line 11 is passed to a surge tank from which it is forwarded to the ethyl chloride purification section of the plant. The uncondensable inerts in line 10 are vented.

The reaction product 12 recovered from the last reactor in the series is passed to an agitated dissolver-flash vessel. The reaction product in line 12 which comprises a slurry of ethyl chloride, tetraethyllead, solid lithium chloride, and unreacted lead and lithium is contacted with water from line 15. The water dissolves any alkali metal salts which may be present in the reaction product. Heat provided by steam in line 13 flashes most, e.g., about 97 percent or more, of the ethyl chloride overhead. The combined dissolving and flashing step is conducted at about 140° F. The flashed ethyl chloride stream in line 14 passes through a water cooled partial condenser which removes most of the vaporized tetraethyllead and refluxes it back to the dissolver-flash vessel.

The underflow in line 16 from the flash vessel flows through a lead filter. The underflow consists of an aqueous phase comprising dissolved alkali metal salts such as lithium chloride, sodium chloride, lithium hydroxide and sodium hydroxide and an organic phase comprising tetraethyllead. Each phase contains minor amounts of other constituents as indicated in the material balance reported hereinafter in Table 1. The filtered lead in line 17 may be reprocessed and recycled to the lead preparation section of the process. The filtrate from the lead filter is forwarded to a phase separator wherein tetraethyllead is separated from the aqueous phase. The organic (tetraethyllead ethyl chloride) phase in line 19 is forwarded to a second flash vessel to which steam in line 20 and water in line 21 are added. Direct steam injection is used to maintain the flash temperature at about 203° F. The second flash vessel communicates with a water cooled partial condenser which removes most of the tetraethyllead and water from the ethyl chloride vapor stream in line 22. The condensed tetraethyllead and water are recycled to the flash vessel. Tetraethyllead is separated from the second stage flash vessel underflow in line 23 by phase separation in a phase separator. The thus separated tetraethyllead stream in line 24 is forwarded to a vessel wherein it is contacted with water from line 25 to remove traces of ethyl chloride, ethyl ether and toluene. The aqueous fraction in line 28 collected from the second phase separator is recycled together with make-up water in line 29, back to the flash vessels.

Non-condensables in line 14 and in line 22 from the water cooled partial condensers communicating with the flash tanks are passed through a low temperature condenser system. The condensed ethyl chloride in line 36 is dried over lithium chloride. The dried ethyl chloride in line 31 is sent to a purification still operating at about 100 p.s.i. An ethyl chloride-n-butane azeotrope and ethane are removed overhead in line 33. The bottoms product containing ethyl chloride, diethyl ether, butane and tetraethyllead is recycled in line 7 to the reactors via the lead-ethyl chloride slurry tank. Preferably lithium chloride is used as the desiccant for drying ethyl chloride to avoid the introduction of impurities into the system.

The lithium chloride solution in line 18, from the first phase separator, is forwarded through a surge tank to a stirred vessel. Acid is added to the vessel to adjust the pH of the solution to about pH 11, to reduce the solubility of lead. This adjusted solution is centrifuged to recover precipitated lead salts. Following the centrifugation, the pH of the solution is again adjusted to about 7 by the addition of acid. This solution is fed to a single effect evaporator-crystallizer operating at about 230° F. and absolute pressure of about 121 millimeters of mercury. The crystal product in line 37 is centrifuged at about 230° F. and dried in a rotary dryer.

The dried lithium chloride in line 39 is fed continuously to lithium chloride fused salt cells. Lithium metal 4 and chlorine are produced in the cells by electrolysis of a molten eutectic mixture of lithium chloride and potassium chloride which melts at about 350° C. and contains about 47 weight percent lithium chloride and about 53 weight percent potassium chloride. Make-up lithium chloride may be added to a surge bin between the crystallizers and the electrolytic cells or it may be added to the crystallizer. Make-up potassium chloride is added directly to the electrolytic cells. High temperatures, i.e., above about 205° F. are required in the evaporator-crystallizer, the centrifuge and the surge bin to avoid hydration of the lithium chloride and to insure an anhydrous lithium chloride feed to the electrolytic cells.

Table 1 reports in part a typical material balance of the aforedescribed process. The material balance assumes that 96 percent of the lead charged and 89 percent of the ethyl chloride charged is converted to tetraethyllead. The lead powder feed contains less than 500 p.p.m. oxygen. The reaction pressure is about 1 atmosphere. The reaction temperature is about 54° F. (12° C.). Based on the lead charged to the reactors, about 10 percent excess lithium and about 250 percent excess ethyl chloride is fed to the reactors. About 8½ percent of the lithium charged is assumed to be consumed in Wurtz reactions. About 1.5 percent of the lithium charged is assumed to be in the form of oxide and/or nitride and as such is unreactive. The material balance also assumes the addition of about 15 mole percent diethyl ether, based on the lead, to the reactors. Twenty percent of the diethyl ether is assumed to be lost by reaction.

TABLE 1

| Composition | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Lithium | | | | 574 | | 574 | | | | | | 9 | | | | | | | | |
| Lead | 3,892 | | | | | | | 3,892 | | | | 117 | | | | 117 | 88 | 29 | | |
| Ethyl chloride | | 5,231 | | | | | 11,735 | 16,966 | 325 | 5 | 320 | 11,478 | | 11,152 | | 326 | (1) | | 326 | |
| Diethyl ether | | | 43 | | | | | 166 | 209 | | | 167 | | 156 | | 11 | | | 11 | |
| Tetraethyllead | | | | | | | | 46 | 46 | | | 5,939 | | 45 | (1) | 5,894 | (1) | 3 | 5,891 | |
| Lithium chloride | | | | | | | | | | | | 3,393 | | | | 3,393 | | 3,393 | | |
| Ethyl lithium | | | | | | | | | | | | 29 | | | | | | | | |
| Ethane | | | | | | | | | 30 | 14 | 16 | | 24 | | | | | | | |
| Butane | | | | | | | | 20 | 20 | 11 | 1 | 10 | 210 | | | 210 | | | | |
| Water | | | | | | | | | | | | | 1,479 | 174 | 3,401 | 4,802 | | 4,802 | | 871 |
| Toluene | | | | | 30 | 30 | | | | | | 30 | | | | 30 | | 30 | | |
| Lithium hydroxide | | | | | | | | | | | | | | | | 62 | | 62 | | |
| Hydrochloric acid | | | | | | | | | | | | | | | | | | | | |
| Ethanol | | | | | | | | | | | | | | | | 26 | | 26 | | |
| Lithium carbonate | | | | | | | | | | | | | | | | | | | | |
| Sodium carbonate | | | | | | | | | | | | | | | | | | | | |
| Total lbs./hr. | 3,892 | 5,231 | 43 | 574 | 30 | 604 | 11,967 | 21,133 | 366 | 20 | 346 | 21,372 | 1,479 | 11,761 | 3,401 | 14,661 | 88 | 8,315 | 6,258 | 871 |

| | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|
| Lithium | | | | | | | | | | | | | | | | | | | |
| Lead | | | | | | | | | | | | | | | | | | | |
| Ethyl chloride | | 312 | 14 | 14 | | | 14 | | | (1) | 11,782 | 2 | 47 | 11,464 | 232 | 11,782 | | | |
| Diethyl ether | | 11 | (1) | (1) | | | (1) | | | | 166 | | | 167 | 1 | 166 | | | |
| Tetraethyllead | (1) | 1 | 5,890 | 5,890 | | 5,835 | 55 | (1) | | | 46 | | | 46 | (1) | 46 | | 3 | |
| Lithium chloride | | | | | | | | | | | | | | | | | 3,417 | | 3,417 |
| Ethyl lithium | | | | | | | | | | | | | | | | | | | |
| Ethane | | | | | | | | | | | 36 | 4 | 36 | 24 | 4 | 36 | | | |
| Butane | | | | | | | | | | | 218 | 2 | 198 | 210 | 5 | 218 | | | |
| Water | | 3,549 | 7 | 4,413 | | 18,000 | | 18,000 | 4,413 | 2,537 | 169 | (1) | | 181 | 1 | 12 | 73 | 6,025 | 10 |
| Toluene | | | | 30 | 30 | | | 30 | | | | | | | | | | | |
| Lithium hydroxide | | | | | | | | | | | | | | | | | | | |
| Hydrochloric acid | | | | | | | | | | | | | | | | | | | |
| Ethanol | | | | | | | | | | | | | | | | | | 26 | |
| Lithium carbonate | | | | | | | | | | | | | | | | | | | |
| Sodium carbonate | | | | | | | | | | | | | | | | | | | |
| Total lbs./hr. | 3,549 | 331 | 10,347 | 5,934 | 18,000 | 5,835 | 18,099 | 4,413 | 2,537 | 169 | 12,248 | 8 | 281 | 12,092 | 243 | 12,260 | 3,490 | 6,054 | 3,427 |

[1] Trace.

Many alterations can be made to the process without departing from the invention. For example, the reactors may be operated at elevated temperature and pressure. Such an operation is in some cases more economical because cooling water may be substituted for refrigeration for cooling the condensers. Lithium may be removed from lithium-containing waste streams by carbonation. The lithium carbonate recovered in this fashion may be treated by HCl to form lithium chloride. Lithium carbonate could be used rather than lithium chloride for make-up lithium in the electrolytic cells. Steam distillations can be employed in place of the flashing operations shown. Addition process steps, well known to the chemical industry, may be included in the plant as deemed appropriate to further minimize the losses of lead, lithium and product.

Quenching media other than toluene may be employed in the production of lithium powder. The criteria for the quenching medium are that it be inert to lithium and that it be compatible with the remainder of the processing scheme and the final product. Thus, the quenching medium should ordinarily be substantially inert to the reactants and by-product suppressors (ether compounds) employed in the reaction. It should be acceptable in minor quantities, e.g., about 1 to about 10 percent by weight based on the product, in the tetrahydrocarbon product or readily removable therefrom. Hydrocarbons which distill at a temperature lower than the product are preferred. Suitable media include alkanes, e.g., hexane and heptane, the corresponding alkenes, e.g., heptene, kerosene and toluene. The acceptability of the quenching medium in the product depends largely on the end use of the product. For example, substantial quantities, e.g., up to 10 percent or more toluene, are generally acceptable in antiknock fluids comprising tetraalkyllead compounds.

Although the present invention contemplates the addition of metallic lithium to the reaction zone, it is recognized that some of the lithium required for the reaction may be introduced as hydrocarbon lithium compounds. In the aforedescribed process, for example, ethyl lithium leaving a reaction zone (stream 12) could be recovered and recycled to the reactors. Depending upon the reaction conditions selected and the completeness of the reaction, the amount of lithium introduced to the reactors in this fashion could be considerable, e.g., up to about 5 rarely more than about 10 mole percent based on the total lithium introduced to the reactors. Lithium metal might also be slurried with hydrocarbon halide prior to its introduction to the reaction zone. In that event, a portion of the lithium may react with the hydrocarbon halide prior to entering the reactors. Generally, the hydrocarbon lithium compounds introduced to the reactor react with lead and hydrocarbon halide to produce tetrahydrocarbon lead. In any event, in the practice of the present invention, most, i.e., at least about 50, preferably above about 80, typically above about 90, percent of the lithium required for the reaction, is introduced to the reaction system in metallic form.

The lead powder may conveniently be prepared in a fashion similar to the described preparation of lithium powder. Suitable quench media for the molten lead include those useful for the preparation of lithium powder as well as the hydrocarbon halide reactant.

The lithium metal may be prepared by techniques other than the specific electrolytic techniques described in connection with the drawing. For example, lithium metal may be produced by electrolyzing fused pure lithium chloride or solution of a lithium salt, e.g., lithium acetylide or lithium perchlorate in liquid ammonia or nitrobenzene solutions of lithium aluminum chloride. Lithium amalgams may be produced by electrolyzing aqueous solutions of lithium compounds at a mercury anode. The lithium may then be extracted from the amalgam into liquid ammonia. Other possible methods for producing lithium metal include thermal decomposition or reduction of lithium compounds. Any of these methods could be integrated into the present process as a means of recovering the lithium values from the lithium halide produced by the reaction. The electrolysis of fused salts such as LiBr-LiCl mixtures, LiH and KCl-LiCl mixtures is presently considered the preferred technique. The electrolysis of fused KCl-LiCl eutectic is highly preferred.

A commercial batch process for the production of tetramethyllead is conducted by charging a pound mole (207 pounds) of minus 325 mesh normal lead powder, 4.4 pound moles (31 pounds) 200 micron lithium powder and 5 pound moles (370 pounds) ethyl ether to a stirred reactor. The stirred reactor communicates with a reflux condenser. Methyl chloride is added to the reactor at a rate sufficiently slow to avoid suppressing the reaction, i.e., at a rate sufficient to establish and maintain an exothermic reaction. The initial reaction is highly exothermic reaction. The initial reaction is highly exothermic as evidenced by a rising temperature of the reaction mass to a selected temperature between ambient and the reflux temperature of the methyl chloride. The rate of addition is adjusted to maintain the selected temperature, e.g., 25° C. If the temperature is observed to decrease, the rate of methyl chloride addition is reduced to reestablish the temperature of the reaction mass at about 25° C. The required rate of addition is readily determined in this fashion within a very short period, on the order of 1 or 2 minutes. Methyl chloride is continuously added to the reactor contents at this rate for several minutes, usually less than an hour, until the temperature of the reaction mass is observed to decrease several degrees, typically to below about 20° C. Sufficient additional methyl chloride is then added at any convenient rate to provide a total of about 6 pound moles (about 300 pounds) of methyl chloride to the reaction zone. The temperature of the reaction mass will decrease depending on the rate of addition of the methyl chloride. After the addition of the methyl chloride, the temperature of the reaction mass is again observed to increase although not as rapidly as during the first stages of the reaction. The reaction mass is stirred continuously and the reaction is allowed to proceed at autogenous temperature and pressure under reflux for about two hours after the addition of all of the methyl chloride. Tetramethyllead in yields above 80 percent, often above 90 percent, based on the lead, is recovered from the reaction from the reaction mass by methods similar to those disclosed in connection with the production of tetraethyllead.

The aforedescribed batch process can be made continuous by carefully controlling the rate of addition of a methyl halide reactant to a receiving slurry of lead and lithium in ethyl ether. Thus, for example, several reactors are provided in series. The feed rates of the reactants to the first reactor and the rate of removal of the slurried reaction mass therefrom are adjusted to maintain a desired volume and composition in the reactor. The first (and as many more as may be required) reactor receives unreacted lithium metal. The feed rate of the methyl halide to these reactors may be correlated to the temperature of the reaction mass as in the aforedescribed batch process or to the concentration of methyl halide remaining unreacted in the ether solvent. This concentration should be kept below about 5 mole percent, preferably below about 1 mole percent until the initial highly exothermic reaction is completed. This phase of the reaction may be completed in the first reactor or in a series of reaction zones. After the reaction has proceeded to the stage that essentially no lithium metal remains unreacted, i.e., after the initial highly exothermic reaction is completed, the reaction mass is passed to a further reactor wherein it is contacted with sufficient additional methyl halide to complete the reaction.

Lead powder, suitable for use in the process of this invention may be prepared by spraying molten lead into a stream of cooled methane in a spray cooler. Lead powder with an average particle size of about 200 microns in diameter and containing less than about 500 p.p.m. oxygen is conveniently produced in this fashion, for example.

Either lead or lithium powders may be prepared by feeding a fine spray of molten metal into a bath of boiling toluene in an agitated quench vessel. Quenching media other than toluene may be employed in the production of these metal powders. The criteria for a lithium quenching medium are that it be inert to lithium and that it be compatible with the remainder of the processing scheme and the final product. Thus, the quenching medium should ordinarily be substantially inert to the reactants and ether compounds employed in the reaction. It should be acceptable in minor quantities, e.g., about 1 to about 10 percent by weight based on the product, in the tetrahydrocarbon product or readily removable therefrom. Hydrocarbons which distill at a temperature higher than the product are preferred. Suitable media include alkanes, e.g., hexane and heptane, the corresponding alkenes, e.g., heptene, kerosene and toluene. The acceptability of the quenching medium in the product depends largely on the end use of the product. For example, up to 10 percent or more toluene is normally acceptable in anti-knock fluids comprising tetraalkyllead compounds. Suitable quench media for the molten lead include those useful for the preparation of lithium powder as well as the hydrocarbon halide reactant.

The lithium metal is usually recycled. Thus, it is typically economically advantageous to recover the lithium values from the lithium halide salt produced by the reaction. This recovery may be accomplished in several ways. For example, lithium metal may be produced by electrolyzing fused pure lithium chloride or a solution of a lithium salt, e.g., lithium acetylide or lithium perchlorate in liquid ammonia or nitrobenzene solutions of lithium aluminum chloride. Lithium amalgams may be produced by electrolyzing aqueous solutions of lithium compounds at a mercury anode. The lithium may then be extracted from the amalgam into liquid ammonia. Other possible methods for producing lithium metal include thermal decomposition or reduction of lithium compounds. Any of these methods could be integrated into the present process as a means of recovering the lithium values from the lithium halide produced by the reaction. The electrolysis of fused salts such as LiBr-LiCl mixture, LiH and KCl-LiCl mixtures is presently considered the preferred technique. The electrolysis of fused KCl-LiCl eutectic is highly preferred. Thus, according to the preferred embodiments of this invention, molten lithium is produced in fused salt cells by electrolysis of a molten eutectic mixture of lithium chloride and potassium chloride which melts at about 350° C. and contains about 47 weight percent lithium chloride and about 53 weight percent potassium chloride. Make-up potassium chloride may be added directly to the cells as required.

Although the present invention contemplates the addition of metallic lithium to the reaction zone, it is recognized that some of the lithium required for the reaction may be introduced as hydrocarbon lithium compounds. In the aforedescribed process, for example, ethyl lithium leaving a reaction zone could be recovered and recycled to a preceding reactor. Depending upon the reaction conditions selected and the completeness of the reaction, the amount of lithium introduced to a reactor in this fashion could be considerable, e.g., up to about 5 rarely more than about 10 mole percent based on the total lithium introduced to the reactors. Lithium metal might also be slurried with hydrocarbon halide prior to its introduction to the reaction zone. In that event, a portion of the lithium may react with the hydrocarbon halide prior to entering the reactors. Generally, the hydrocarbon lithium compounds introduced to the reactor react with lead and hydrocarbon halide to produce tetrahydrocarbon lead.

In any event, in the practice of the present invention, most, i.e., at least about 50, preferably above about 80, typically above about 90, percent of the lithium required for the reaction, is introduced to the reaction system in metallic form.

The following examples illustrate the manner in which the present invention may be practiced:

EXAMPLE I

Several ethylations were conducted in a reactor consisting of a 500 ml. round bottomed three-necked flask. The necks were fitted with a gas inlet tube, a condenser and a mechanical stirrer, respectively. All glassware was dried in an oven at 125° C. prior to use.

Lithium powder was weighed into tared glass ampules inside an inert atmosphere box filled with argon. In each ethylation, an ampule was placed in a plastic bag fastened around one neck of the reaction flask. Argon was introduced to displace the air from the system. The ampule was broken and the lithium powder was poured into the reactor. Lead powder was then poured into the reactor in a slight counter-current of argon. Ethyl chloride was added to the reaction from a cold finger trap. Fifty mole percent diethyl ether, based on the lead charge was added by means of a syringe through a sample port. The ether was dried over metallic sodium prior to use. The reaction was stirred vigorously to maintain the lithium and lead powders in suspension in the liquid phase. Rapid refluxing began within about five minutes after the addition of the ether. The reaction was considered to be initiated when refluxing began. The reaction temperature was maintained between about 12 and about 14° C. through refluxing of the ethyl chloride. After a four hour reaction period, the reaction was stopped by introducing water to the reaction mass. The tetraethyllead was extracted with heptane. Gasses, evolved during the reaction and as a result of the addition of water to the reaction mass, were collected and measured by means of gas burettes.

Table 2 reports the quantities of reactants employed and the yield data obtained.

TABLE 2

Direct alkylation of lead metal to produce tetraethyllead (TEL)

| Expt. No. | Grams atoms Li [3] | Percent Li excess | Grams atoms Pb [4] | Moles EtCl [5] | Percent EtCl excess | Yield TEL by GC [6] analysis |
|---|---|---|---|---|---|---|
| 1 | 0.654 | 9.0 | 0.150 | 2.17 | 262 | 91.2 |
| 2 | 0.658 | 9.7 | 0.150 | 2.06 | 243 | 90.0 |
| 3 | 0.622 | 3.7 | 0.150 | 1.80 | 200 | 91.6 |
| 4 [1] | 0.653 | 10.0 | 0.148 | 1.49 | 152 | 91.3 |
| 5 | 6.679 | 13.3 | 0.150 | 1.24 | 107 | 79.1 |
| 6 [2] | 0.723 | 10.2 | 0.164 | 1.30 | 97 | 89.0 |
| 7 | 0.658 | 9.7 | 0.150 | 1.29 | 115 | 85.3 |

[1] Reaction time of 3½ hours.
[2] Reaction time of 3 hours.
[3] 200 micron powder. By chemical analysis, this powder was found to contain about 0.9% by weight nitrogen. Traces of Mg, Pb, Fe, Cu, Al and Si were detected by emission spectroscopy. 1.67 percent by weight oxygen was detected by neutron activation analysis.
[4] Screen analysis: 1.8%+230 mesh, 8.7% −230 +325 mesh, 89.4% −325 mesh. Neutron activation analysis showed the presence of 1,320 p.p.m. oxygen by weight.
[5] Gas chromatographic analysis showed the presence of 0.16% ethylene. Water content varied in the range of 13–17 p.p.m. by weight based on ethyl chloride.
[6] Gas chromatography.

EXAMPLE II

The apparatus employed and procedure followed for this example were essentially the same as for Example I. Several ethylations were conducted at normal reflux temperatures (12–14° C.). All of the ethylations were run by introducing 0.150 gram-moles of lead and 0.075 gram-moles of ethyl ether to the reactors. A variety of lead reagents were charged in individual ethylations. Other reaction conditions and yields are reported on Table 3. Polarographic analysis showed that substantially all of the hydrocarbonlead produced was tetraethyllead.

EXAMPLE III

Following the procedure of Example I, a variety of ether compounds was substituted for ethyl ether. Several ethylations were conducted with 0.150 gram mole of lead, 0.075 gram-mole of ether, a reaction time of 4 hours and a reaction mass temperature of 12–14° C. Other reaction conditions and yields are reported in Table 4.

TABLE 3.—ETHYLATION WITH VARIOUS LEAD REAGENTS

| Expt. No. | Type of lead | Gram-atoms lithium [6] | Percent lithium excess | Moles EtCl | Reaction time, hours | Yields of TEL by EDTA [7] analysis |
|---|---|---|---|---|---|---|
| 1 | Powder [1] | 0.700 | 16.6 | 2.26 | 4 | 97.5 |
| 2 | do [1] | 0.700 | 16.6 | 2.16 | 2 | 96.6 |
| 3 | do [1] | 0.675 | 12.5 | 2.17 | 4 | 94.6 |
| 4 | do [2] | 0.678 | 13.0 | 2.12 | 4 | 88.7 |
| 5 | do [2] | 0.696 | 16.0 | 2.14 | 4 | 89.2 |
| 6 | Shot [3] | 0.672 | 12.0 | 2.12 | 4 | 58.7 |
| 7 | do [4] | 0.616 | 2.7 | 2.22 | 4 | 66.7 |
| 8 | By-product [5] | 0.648 | 8.0 | 2.14 | 4 | 92.7 |

[1] About 90 weight percent −352 mesh reagent grade lead powder containing about 550 p.p.m. by weight oxygen.
[2] About 90 weight percent −325 mesh reagent grade lead powder containing 1,320 p.p.m. by weight oxygen.
[3] 33.9 percent +20 mesh, 59.9 percent −20 +30 mesh, 6.2 percent −30 mesh lead shot containing about 500 p.p.m. oxygen.
[4] 33.9 percent +20 mesh, 59.9 percent −20 +30 mesh, 6.2 percent −30 mesh lead shot containing about 725 p.p.m. oxygen.
[5] Lead recovered from a commercial autoclave ethylation conducted in accordance with equation (1).
[6] The reported weights are adjusted to account for 3.12 weight percent $Li_2O$ and 2.24 weight percent $Li_3N$. The lithium was charged as powder of about 200 microns particle size containing about 1 percent sodium physically dispersed thereon.
[7] Ethylenediamine tritration.

TABLE 4

Ethylations of lead metal [1] in the presence of lithium and various ether compounds

| Expt. No. | Ether | Gram-atoms lithium [2] | Percent excess lithium | Moles ethyl chloride | Yields of TEL by EDTA analysis [3] |
|---|---|---|---|---|---|
| 1 | Diisopropyl ether | 0.656 | 9.3 | 2.18 | 86.0 |
| 2 | Tetrahydrofuran | 0.636 | 6.0 | 2.18 | 84.7 |
| 3 | 1,2-dimethoxyethane [4] | 0.681 | 13.5 | 2.20 | 60.7 |
| 4 | Bis-(2-ethoxyethyl) [4] ether | 0.637 | 6.1 | 2.18 | 60.3 |
| 5 | n-Butyl ether | 0.634 | 5.7 | 2.16 | 88.7 |
| 6 | Tetrahydropyran | 0.648 | 8.0 | 2.16 | 86.2 |
| 7 | n-hexyl ether | 0.65 | 8.3 | 2.16 | 89.3 |

[1] The lead powder contained about 1,300 p.p.m. by weight oxygen and had a screen weight analysis of 1.8 percent +230 mesh, 8.7 percent −230 +325 mesh, 89.4 percent −325 mesh.
[2] Corrected for 1.4 weight percent oxygen and 0.06 weight percent nitrogen impurities assuming they are present as $Li_2O$ and $Li_3N$, respectively.
[3] Polargraphic analysis showed that hexaethyldilead was found only in experiment 1 where only $5.5 \times 10^{-4}$ mole was formed.
[4] 0.0375 gram-moles of these compounds were charged to give a 0.075 gram-mole ether equivalent.

EXAMPLE IV

The procedure of Example I was followed. 0.224 gram-atom lithium metal powder with an average particle size of about 200 microns, 0.0496 gram-atom lead powder (about 90 percent −325 mesh and containing 4,990 p.p.m. oxygen) and about 0.7 gram-mole of ethyl chloride were introduced to the reactor. Assuming the oxygen in the lead was all in the form of PbO, 0.0465 gram-atom of lead metal was present in the reaction zone. The reaction was conducted at about 12° C. for about 4 hours. Polargraphic analysis of the reaction mass detremined the presence of 0.0136 gram-atom of lead as hexaethyldilead, 0.001 gram-atom of lead as $Et_3PbCl$ and 0.0310 gram-atom of lead as tetraethyllead.

EXAMPLE V

Several methylations were carried out in 500 ml. three-necked, Morton-type flasks. The necks were fitted with a gas inlet tube, a high speed stirrer and a Dewar condenser, respectively. Each flask was modified by the addition of a thermowell and a fourth neck consisting of a quarter-inch diameter glass tube stoppered by a rubber serum cap. In each methylation reaction, the reactor was vented through a mercury bubbler and connected to an argon source. The vent tube was provided with a by-pass line leading to two liter burettes filled with leveling solution for the collection of gas samples.

The reactor parts were dried overnight at 150° C. and assembled while hot. Dry argon was flushed through the system for several hours. Ampules of lead and lithium powder were prepared under an argon atmosphere. The ampules of lithium and lead powder were placed in a plastic bag and the bag fitted around the neck of the flask. An argon line was inserted into the bag and the bag flushed for about 30 minutes. The lithium and lead were charged to the reactor under the argon atmosphere created inside the bag. The appropriate quantity of ether was added to the reactor with a dry syringe through the serum cap. The methyl chloride was condensed in a "cold-finger" trap, weighed and allowed to distill into the reactor at a constant rate of about ½ gram per minute over a period of about 1½ hours. The reaction began with the commencement of the addition of methyl chloride. The reaction was stopped by distilling off the unreacted methyl chloride and adding water to the reaction mass. All volatile compounds produced during the reaction and as a result of the addition of water were collected in the burettes and sampled. The reaction mixture was filtered to remove all unreacted lead. The aqueous layer was extracted twice with ethylene dichloride to recover the organolead therefrom.

Table 5 reports the reaction conditions employed and yield data obtained. The methylations were all conducted at atmospheric pressure with a reaction period of 4 hours. The reaction period was determined as in Example I.

TABLE 5

Preparation of tetramethyllead (TML) by reacting methyl chloride with lithium powder and lead powder in the presence of ethyl ether solvent

| Expt. No. | Gram-atoms Pb [1] | Gram-atoms Li metal [2] | Percent excess Li | Gram-moles MeCl | Percent excess MeCl | Gram-moles EtO | Percent conversion of Pb to TML [3] |
|---|---|---|---|---|---|---|---|
| 1 | 0.150 | 0.693 | 15.5 | 1.48 | 147 | 1.98 | 85.5 |
| 2 | 0.151 | 0.679 | 12.4 | 1.60 | 165 | 2.46 | 82.0 |
| 3 | 0.150 | 0.679 | 13.2 | 1.54 | 157 | 2.47 | 91.2 |
| 4 | 0.150 | 0.695 | 15.8 | 1.59 | 165 | 2.44 | 86.3 |

[1] The lead powder employed in Experiments 2, 3 and 4 contained about 1,700 p.p.m. by weight oxygen. The lead powder used in Experiment 1 contained about 500 p.p.m. by weight oxygen.
[2] The lithium powder used contained 1 percent by weight sodium. The quantities given are corrected to account for $O_2$ and $N_2$ which were assumed to be present as $Li_2O$ and $Li_3N$.
[3] By gas chromatography.

EXAMPLE VI

The procedure was the same as in Example V except for the mode of addition of the methyl chloride. In Runs 3 and 4 all of the methyl chloride was added as liquid at the beginning of the reaction. In Runs 1 and 2, the methyl chloride was distilled into the reactor at a rate of 0.5 gram per minute. The methyl chloride employed contained about 1700 p.p.m. oxygen and had a screen analysis approximately the same as the lead powder of Example I. The lithium powder had an average particle size of about 200 microns and contained about 1 percent by weight sodium. Table 6 reports the proportions of the reactants employed and the yields obtained.

TABLE 6

| Expt. No. | Gram-atoms Pb | Gram-atoms Li metal | Percent excess Li | Gram-moles MeCl | Percent excess MeCl | Gram-moles EtO | Yield TML by GC analysis |
|---|---|---|---|---|---|---|---|
| 1 | 0.10 | 0.429 | 7.2 | 1.30 | 225 | 2.86 | 70.0 |
| 2 | 0.05 | 0.213 | 6.5 | 0.84 | 320 | 1.38 | 65.2 |
| 3 | 0.15 | 0.680 | 13.3 | *1.50 | 150 | 2.2 | 5.1 |
| 4 | 0.15 | 0.650 | 8.3 | *1.38 | 130 | 1.96 | 5.8 |

*MeCl all added at beginning of reaction as liquid.

EXAMPLE VII

Methylations conducted in accordance with the procedure of Example VI but in which less than about 150 mole percent of an ether solvent based on the lead required by the stoichiometry of the reaction is present in the reactor prior to the addition of methyl chloride result in very low yields.

EXAMPLE VIII

The procedure of Example V was followed. The reagents used for this example were the same as those used for Example VI except the lithium powder. A vigorous reaction began shortly after the addition of methyl chloride was begun causing the reaction temperature to rise. As additional methyl chloride was introduced, the initial highly exothermic reaction subsided and the temperature of the reaction mass dropped. Reaction was continued for 4 hours. Reaction conditions and yields are reported in Table 7.

TABLE 7.—METHYLATIONS OF LEAD IN THE PRESENCE OF LITHIUM OF VARYING PURITY

| Expt. No. | Reaction time, ° C.[1] | Gram-atoms Pb | Gram-atoms Li[2] metal | Percent Na in Li[3] | Percent excess Li | Moles MeCl | Percent excess MeCl | Moles EtO | Percent conversion Pb to TML |
|---|---|---|---|---|---|---|---|---|---|
| 1 | 30:4 | 0.150 | 0.765 | 0 | 27.5 | 1.64 | 173 | 2.34 | 38.5 |
| 2 | 31:3 | 0.150 | 0.643 | 0 | 7.2 | 1.57 | 162 | 2.23 | 29.8 |
| 3 | 32:8 | 0.150 | 0.679 | 1 | 13.9 | 1.54 | 157 | 2.47 | 91.2 |
| 4 | 32:8 | 0.150 | 0.695 | 1 | 15.8 | 1.59 | 165 | 2.44 | 86.3 |

[1] The first temperature is the highest temperature recorded during the initial stage of the reaction. The second temperature is the lowest temperature recorded during the 4-hour reaction period.
[2] Powder with an average particle size of 200 microns diameter. The reported quantities are corrected to account for an oxygen content of about 550 p.p.m.
[3] The sodium was physically dispersed in the molten lithium prior to preparing the lithium powder. Only trace amounts of other impurities were present.

EXAMPLE IX

The procedure of Example I produces good yields of tetrahydrocarbonlead compounds when ethyl chloride, propyl chloride, butyl chloride, vinyl chloride, phenyl chloride, or the corresponding iodides or bromides, methyl iodide or methyl bromide is substituted for methyl chloride.

EXAMPLE X

Diisopropyl ether, tetrahydrofuran, 1,2 - dimethoxyethane, bis-(2-ethoxyethyl) ether, n-butyl ether, tetrahydropyran and n-hexyl ether are substituted for ethyl ether in Example V. Good yields of tetramethyllead are obtained.

Although this invention has been described with particular reference to details of certain preferred embodiments, it is not intended thereby to limit the scope of the invention except insofar as these details are recited in the appended claims.

Although the disclosure makes particular reference to the preparation of tetrahydrocarbonlead compounds, it should be understood that other elements of Group IV of the periodic table of elements, notably tin, may be substituted for lead to produce the corresponding tetrahydrocarbon compounds, e.g., tetraoctyltin.

I claim:

1. A method of making hydrocarbonlead in which the hydrocarbon constituents each contain at least two carbon atoms comprising reacting lead, hydrocarbon halide and high purity lithium metal containing more than 0.1 up to about 5 percent by weight alkali metal other than lithium in a said reaction zone to produce a reaction mass therein, said reaction zone containing at least 4 moles high purity lithium metal per mole of lead employed and sufficient hydrocarbon halide to react with the metallic lithium fed to said zone maintaining the reaction mass in said reaction zone below about 60° C. during reaction, collecting the reaction mass from said reaction zone and recovering hydrocarbonlead compound from said reaction mass.

2. The method of claim 1 wherein the hydrocarbon halide reactant is an alkyl halide and the compound produced in the reaction zone is a tetraalkyllead compound.

3. The method of claim 2 wherein the temperature of the reaction mass is maintained below about 45° C., the reaction comprises a first highly exothermic portion and a subsequent less exothermic portion and the temperature of the reaction mass during the less exothermic portion of the reaction is conducted at autogenous temperature and pressure conditions under reflux of the hydrocarbon halide reactant.

4. The method of claim 3 wherein the entire reaction is conducted at autogenous temperature and pressure.

5. The method of claim 2 wherein the alkyl halide comprises ethyl chloride and the tetraalkyllead compound produced is tetraethyllead.

6. The method of producing a hydrocarbonlead compound of which the hydrocarbon constituents each contain at least two carbon atoms which comprises charging finely-divided normal lead powder and, based upon the lead charged at least 8 moles of hydrocarbon halide and at least 4 moles of high purity lithium metal containing more than 0.1 up to about 5 percent sodium by weight to a reaction zone, reacting the material so charged therein to produce a reaction mass and recovering tetrahydrocarbonlead compound from said reaction mass.

7. The method of claim 6 wherein the finely-divided lead reactant has an average particle size of below 1 millimeter in diameter and contains less than 1,000 parts by weight of oxygen.

8. The method of claim 6 wherein the lead reactant contains less than about 1,000 parts per million by weight of oxygen and has an average particle size below about 1 millimeter in diameter, the alkyl halide comprises ethyl chloride and the tetrahydrocarbonlead compound comprises tetraethyllead.

9. The method of claim 6 wherein the lead reactant contains less than 500 parts per million by weight oxygen and has an average particle size below about 1 millimeter in diameter, the alkyl halide is ethyl chloride and the tetrahydrocarbonlead compound is tetraethyllead.

10. A method of making hydrocarbonlead compounds of which the hydrocarbon constituents each contain at least two carbon atoms which comprises reacting finely-divided lead, hydrocarbon halide and high purity lithium metal containing more than 0.1 up to about 5 percent by weight alkali metal other than lithium in a reaction zone to produce a reaction mass therein, the high purity lithium metal being present in quantity sufficient to provide at least 4 moles of lithium per mole of finely-divided lead and sufficient hydrocarbon halide is provided to react with the lithium present and recovering hydrocarbon lead compound from the reaction mass.

11. The method of claim 10 wherein the hydrocarbon halide is alkyl halide and the hydrocarbonlead compound comprises tetraalkyllead compound.

12. The method of claim 11 wherein the alkyl halide is ethyl chloride and the hydocarbonlead compound is tetraethyllead.

13. The method of producing a tetrahydrocarbonlead compound of which the hydrocarbon constituents each contain at least two carbon atoms which comprises reacting lead, a hydrocarbon halide and high purity metallic lithium containing more than 0.1 up to about 5 percent by weight alkali metal other than lithium in the presence of an ether compound to produce a reaction mass, the quantity of high purity lithium metal fed thereto being at least 4 moles basis the quantity of lead fed thereto and recovering from the reaction mass a tetrahydrocarbonlead compound.

14. The method of claim 10 wherein at least about 10 mole percent based on the lead of an ether compound selected from the group consisting of alkyl ethers, tetrahydrofuran and tetrahydropyran is introduced to the reaction zone during the course of the reaction.

15. The method of claim 14 wherein the alkyl halide is ethyl chloride and the tetraalkyllead compound comprises tetraethyllead.

16. A method of making a tetrahydrocarbonlead compound which comprises reacting in the presence of an ether compound a high purity lithium metal containing more than 0.1 up to about 5 percent by weight sodium, lead metal and a hydrocarbon halide to produce a reaction mass, the hydrocarbon halide being introduced during the reaction at a rate sufficiently slow to maintain an exothermic reaction until substantially all of the said high purity lithium metal has reacted, while maintaining the reaction mass at a temperature below about 60° C. during this addition, adding sufficient hydrocarbon halide and metallic lithium basis the lead used to the reaction mass to effect the conversion of said lead to tetrahydrocarbonlead basis the reaction $Pb + 4Li + 4RX \rightarrow Pb(R)_4 + 4LiX$ and recovering a tetrahydrocarbonlead compound from the reaction mass.

17. The method of claim 16 wherein the hydrocarbon halide is methyl halide.

18. The method of claim 16 wherein the alkyl halide is methyl chloride, and the reaction is conducted at temperature below about 45° C.

19. The method of producing tetrahydrocarbonlead compound of which the hydrocarbon constituents each contain at least two carbon atoms which comprises introducing to a reaction zone lead, at least about 4 moles of high purity metallic lithium for each mole of lead introduced the lithium metal reactant containing more than 0.1 up to about 5 percent by weight of an alkali metal other than lithium and hydrocarbon halide of which the hydrocarbon constituents contain at least two carbon atoms, the hydrocarbon halide being present in a quantity sufficient to react with the metallic lithium present to form lithium halide to thereby produce a reaction mass comprising said tetrahydrocarbonlead compound and said lithium halide, said method including at least four of the additional limitations:
  (a) the reaction is conducted at a temperature below about 60° C.;
  (b) the lead reagent is normal metallic lead powder with an average particle size below about 1 millimeter in diameter;
  (c) the lead reagent contains less than about 1,000 p.p.m. by weight oxygen;
  (d) an ether compound is introduced to the reaction zone before completion of the reaction; and
  (e) At least the smaller of:
    (1) 8 moles per mole of lead; and
    (2) 2 moles per mole of lithium of the hydrocarbon halide are added to the reaction zone.

20. The method of making tetrahydrocarbonlead compound which comprises introducing to a reaction zone lead metal, at least about 4 moles of high purity lithium metal for each mole of lead introduced, said high purity lithium metal containing more than about 0.1 up to about 5 percent by weight of an alkali metal other than lithium and between about 1½ to about 20 moles of an ether solvent for each mole of lead introduced thereto gradually adding to said reaction zone a hydrocarbon halide in quantity sufficient to react with the lithium metal present to produce a reaction mass comprising said tetrahydrocarbonlead compound and a lithium halide, said method also including the following conditions:
  (a) the reaction is conducted at a temperature below about 60° C.
  (b) the lead reagent charged to the reaction zone is normal lead powder with an average particle size below about 1 millimeter in diameter;
  (c) the lead reagent contains less than about 1,000 p.p.m. oxygen; and
  (d) the concentration of methyl halide in the ether solvent is held below about 5 mole percent during the first highly exothermic part of the reaction.

21. The method of claim 7 wherein the lead reactant contains less than about 500 p.p.m. by weight oxygen.

22. The method of claim 10 wherein the alkyl halide reactant comprises butyl chloride and the tetraalkyllead compound comprises tetrabutyllead.

23. The method of claim 19 including at least one of the limitations:
  (a) the reaction is conducted at a temperature below about 45° C.;
  (b) the lead reactant is normal lead powder with an average particle size below about 1 millimeter in diameter and containing less than about 500 p.p.m. oxygen; and
  (c) at least 10 mole percent, based on the lead, of an ether compound is introduced to the reaction zone before completion of the reaction.

24. The method of claim 23 wherein at least 10 mole percent, based on the lead, of an ether compound selected from the group consisting of alkyl ethers, tetrahydrofuran and tetrahydropyran is introduced to the reaction zone before the completion of the reaction.

25. The method of claim 19 wherein the hydrocarbon halide comprises an alkyl halide and the tetrahydrocarbonlead compound comprises a tetraalkyllead compound.

26. The method of claim 25 wherein the alkyl halide consists essentially of alkyl chloride.

27. The method of claim 25 wherein the alkyl halide consists essentially of ethyl halide and the tetraalkyllead compound consists essentially of tetraethyllead.

28. The method of claim 27 wherein the ethyl halide consists essentially of ethyl chloride.

29. The method of claim 28 wherein at least 10 mole percent, based on the lead, ethyl ether is introduced to the reaction zone before completion of the reaction.

30. The method of producing tetraethyllead which comprises introducing finely-divided normal lead, at least about 8 moles of ethyl chloride per mole of lead, at least about 4 moles of lithium metal containing more than 0.1 up to about 5 percent sodium per mole of lead and at least about 10 mole percent, based on the lead, alkyl ether to a reaction zone to produce a reaction mass, maintaining the reaction mass below about 60° C. until at least about 80 percent of the lead charged has been converted to tetraethyllead and recovering tetraethyllead from the reaction mass.

31. The method of claim 30 wherein the finely-divided lead has an average particle size below about 1 millimeter in diameter, the lithium metal is finely-divided, and the lead powder contains less than about 500 p.p.m. by weight oxygen.

32. The method of claim 31 wherein the alkyl ether compound is ethyl ether.

33. The method of claim 32 wherein at least about 4.4 moles of lithium metal are provided to the reaction zone per mole of lead introduced thereto.

34. The method of claim 20 wherein the hydrocarbon halide comprises methyl halide.

35. The method of claim 34 wherein the methyl halide comprises methyl chloride.

36. The method of claim 35 including at least one of the limitations:
(a) the reaction is conducted at a temperature below about 45° C.;
(b) the lead reagent has an average particle size of about 5 to about 500 microns in diameter;
(c) the lead reagent contains less than about 500 p.p.m. oxygen; and
(d) the concentration of the methyl chloride in the ether solvent is held below about 1 mole percent during the initial highly exothermic stage of the reaction.

37. The method of claim 36 wherein the ether solvent is selected from the group consisting of alkyl ethers, tetrahydrofuran and tetrahydropyran.

38. The method of claim 20 wherein the alkali metal impurity comprises sodium.

39. The method of making tetramethyllead which comprises introducing finely-divided normal lead, at least 4 moles of lithium metal per mole of lead, said lithium metal containing more than 0.1 up to about 5 percent sodium by weight, and at least 1½ moles of an alkyl ether per mole of lead to a reaction zone, introducing methyl halide to said zone at a rate sufficient to maintain the temperature of the reaction mass at a selected temperature below about 60° C., continuing to introduce methyl halide at said rate until the temperature of the reaction mass decreases, introducing additional methyl halide to the reaction zone until the total amount of methyl halide introduced to said zone is up to 8 moles per mole of lead and recovering tetramethyllead from said reaction zone.

40. The method of claim 39 wherein a second hydrocarbon halide other than methyl halide is also introduced to the reaction zone and mixed tetrahydrocarbonlead compounds containing methyl constituents are produced together with tetramethyllead.

41. The method of claim 40 wherein the second hydrocarbon halide comprises ethyl halide or vinyl halide.

42. The method of claim 39 wherein the methyl halide is methyl chloride.

43. The method of claim 42 wherein the entire reaction is conducted at a temperature below about 45° C.

44. The method of claim 39 wherein the ether solvent is ethyl ether.

45. The continuous process for making tetrahydrocarbonlead compounds which contain methyl constituents which comprises feeding to a first reaction zone, finely-divided lead metal, lithium metal containing an alkali metal impurity, an ether solvent and hydrocarbon halide, including methyl halide, to produce a reaction mass and withdrawing from said first reaction zone a portion of said reaction mass, the rates of introduction and withdrawal, respectively, being selected to maintain in said reaction zone, including both reacted and unreacted forms, at least 4 moles of lithium containing more than 0.1 up to about 5 percent sodium by weight and at least 4 moles of the ether solvent per mole of lead and no more than about 5 mole percent unreacted methyl halide based on the ether solvent, forwarding the withdrawn portion of the reaction mass to a second reaction zone, introducing additional methyl halide to said second reaction zone at a rate to maintain less than about 5 mole percent unreacted methyl halide, based on the ether solvent, in said second zone until essentially all of the lithium metal is reacted, then adding additional hydrocarbon halide to the reaction mass until the total amount of hydrocarbon halide added to the reaction mass is at least 4 moles per mole of lead, and recovering tetrahydrocarbonlead compounds which contain methyl constituents from the reaction mass.

46. The method of claim 45 wherein the hydrocarbon halides are the chloride.

47. The method of claim 45 wherein the hydrocarbon halide consists essentially of methyl chloride.

48. The method of claim 47 wherein the reaction mass is withdrawn from the second reaction zone prior to the addition of all of the methyl chloride and is forwarded to a third reaction zone wherein the remainder of the methyl chloride is introduced.

49. The method of claim 47 wherein the concentration of unreacted methyl chloride is maintained below about 1 mole percent, based on the ether solvent until essentially all of the lithium has reacted.

50. The method of claim 47 wherein the ether solvent is selected from the group consisting of alkyl ethers, tetrahydrofuran and tetrahydropyran.

51. The method of claim 50 wherein the ether solvent is ethyl ether.

52. The method of claim 50 wherein the composition in the first reaction zone includes at least 4.4 moles of lithium per mole of lead.

53. The method of claim 47 wherein the methyl chloride feed to the reaction mass is sufficiently slow to maintain an exothermic reaction until essentially all of the lithium is reacted.

References Cited
UNITED STATES PATENTS

| | | | |
|---|---|---|---|
| 2,558,207 | 6/1951 | Calingaert et al. | 260—437 |
| 2,960,515 | 11/1960 | Wiczer | 260—437 |
| 3,442,923 | 5/1969 | Gray et al. | 260—437 |

FOREIGN PATENTS

| | | |
|---|---|---|
| 854,776 | 11/1960 | Great Britain. |

OTHER REFERENCES

Shapiro: "Metal Organic Compounds," No. 13 of the Advances in Chemistry Series, ACS (1959), pp. 290 to 298.

TOBIAS E. LEVOW, Primary Examiner

H. M. S. SNEED, Assistant Examiner